United States Patent Office 3,152,135
Patented Oct. 6, 1964

3,152,135
HETEROCYCLIC SUBSTITUTED INDAZOLE COMPOUNDS AND PROCESS THEREFOR
John Shavel, Jr., Mendham, Maximilian von Strandtmann, Rockaway Township, and Marvin P. Cohen, New Milford, N.J., assignors to Warner-Lambert Pharmaceutical Company, Morris Plains, N.J., a corporation of Delaware
No Drawing. Filed Nov. 2, 1962, Ser. No. 235,121
5 Claims. (Cl. 260—294.7)

The present invention relates to certain novel indazole compounds of the formula:

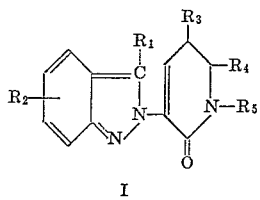

I and

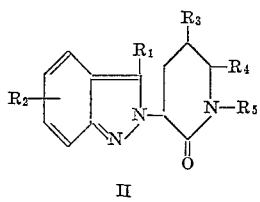

II

In the novel compounds of our invention $R_1$ may be lower alkyl of from one to four carbon atoms, for example, methyl, ethyl, propyl and butyl; aryl such as phenyl, or a substituted phenyl

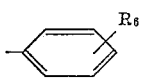

wherein $R_6$ may be a monovalent nuclear substituent such as lower alkoxy, halogen, e.g. chlorine, bromine or fluorine, trifluoromethyl; a bicyclic aryl group such as naphthyl, or a heterocyclic group such as pyridyl or pyrimidyl, $R_2$ may be lower alkoxy or halogen and $R_3$, $R_4$ and $R_5$ may be hydrogen or lower alkyl.

The present invention also includes within its scope compounds of the formula:

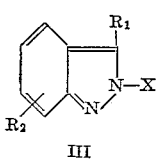

III and

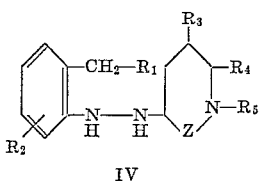

IV wherein X may be

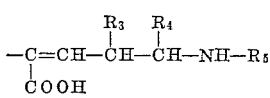

or

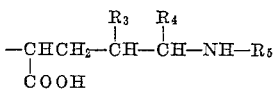

and Z may be a methylene —$CH_2$— or a carbonyl

group and $R_1$, $R_2$, $R_3$, $R_4$ and $R_5$ have the same significance as above.

The novel compounds of our invention are useful, for example, as hypnotic agents. In addition, they are useful as intermediates in the preparation of other indazole compounds. Those compounds of structural Formulas I and II above are obtained by heating a phenylhydrazone of the formula:

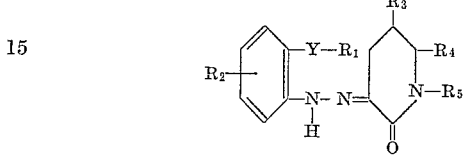

V wherein Y is a

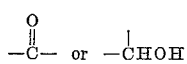

group and the substituents $R_1$, $R_2$, $R_3$, $R_4$ and $R_5$ have the significance above, in a mineral acid or in formic or acetic acid, preferably at or about reflux temperature. The resulting ring closure forms the novel substituted indazoles described above.

The hydrazones which are employed as intermediates for the ring-closure reaction are obtained by diazotizing an ortho-substituted amine such as:

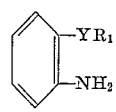

wherein Y and $R_1$ have the same meaning as above and coupling the resulting diazo compound with a substituted carboxy-2-piperidone of the formula:

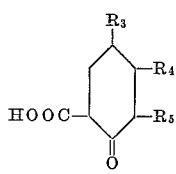

to form the hydrazone intermediate V above.

We have found that the novel compounds of our invention of the structural Formula II above may also be prepared by catalytically reducing compounds of structural Formula I employing gaseous hydrogen at atmospheric pressure and a hydrogenation catalyst such as palladium on carbon, for example.

Compounds of structural Formula III above are prepared, for example, by the hydrolysis of compounds of the structural Formulas I and II in an acidic or basic reaction medium. The hydrolysis may be effected, for example, by refluxing a solution of the desired indazole with a solution of alkali or mineral acid.

Compounds of structural Formula IV above in which Z is a carbonyl group are prepared, for example, by reducing compounds of structures I and II in an inert solvent employing gaseous hydrogen at atmospheric pressure and catalysts such as palladium on charcoal. The reaction is readily effected at 20°–25° C. Further reduction employing, for example, a reducing metal hydride such as lithium aluminum hydride in excess and at reflux temperature results in the reduction of the carbonyl group to a methylene group.

In order further to illustrate this invention but without being limited thereto the following examples are given:

EXAMPLE 1

D,L-2,3-Piperidinedione-3-[o-(α - Hydroxyethyl)Phenyl] Hydrazone

A suspension of 0.1 mole of 3-carbethoxy-2-piperidione in 200 ml. 0.5 N potassium hydroxide is stored at 30° C. for eighteen hours, filtered, and treated with 10 ml. 6 N hydrochloric acid. The resulting solution is added with stirring at 0° C. to a fresh solution of o-(α-hydroxyethyl) benzenediazonium chloride; (prepared from 0.1 mole of o-(α-hydroxyethyl)aniline in 191 ml. 2.7 N hydrochloric acid and 0.122 mole sodium nitrite in 25 ml. of water). The pH of the reaction mixture is adjusted to 3.5 by the addition of an aqueous solution of sodium acetate followed by stirring at 0°–10° C. for five hours to obtain D,L-2,3-piperidinedione-3-[o-(α - hydroxyethyl)phenyl]hydrazone as a precipitate. The precipitate is filtered off, washed with cold water, and recrystallized either from 70% or 95% ethanol; M.P. 233°–235° C.

Analysis for $C_{13}H_{17}N_3O_2$—Calc.: C, 63.14; H, 6.93; N, 16.99. Found: C, 63.37; H, 6.70; N, 16.70.

EXAMPLE 2

D,L-2,3-Piperidinedione-3-[o-(α-Hydroxybenzyl) Phenyl]Hydrozone

A suspension of 0.1 mole of 3-carbethoxy-2-piperidone in 200 ml. of 0.5 N potassium hydroxide is stored at 30° C. for eighteen hours, filtered, and treated with 10 ml. 6 N hydrochloric acid. The resulting solution is added with stirring at 0° C. to a fresh solution of o-(α-hydroxybenzyl)benzenediazonium chloride. The pH of the reaction mixture is adjusted to 3.5 by the addition of an aqueous solution of sodium acetate followed by stirring at 0°–10° C. for five hours to give D,L-2,3-piperidinedione - 3 - [o-(α-hydroxybenzyl)phenyl]hydrazone as a precipitate. The precipitate is filtered, washed with cold water, and recrystallized either from 70% or 95% ethanol; M.P. 249°–250° C.

Analysis for $C_{18}H_{19}N_3O_2$—Calc.: C, 69.88; H, 6.19; N, 13.58. Found: C, 70.08; H, 6.01; N, 13.38.

EXAMPLE 3

3-Methyl-2-(1,2,5,6-Tetrahydro-2-Oxo-3-Pyridyl)-2H-Indazole

A solution of 20 g. of o-acetylphenylhydrazone of 2,3-piperidinedione in 200 ml. glacial acetic acid is refluxed for six hours. The reaction mixture is chilled and adjusted to pH 8 with concentrated ammonia to obtain 3-methyl-2-(1,2,5,6-tetrahydro - 2 - oxo-3-pyridyl)-2H-indazole as a precipitate. The precipitated product is filtered off, washed with cold water, and recrystallized from ethyl acetate; M.P. 188°–191° C.

Analysis for $C_{13}H_{13}N_3O$—Calc.: C, 68.70; H, 5.76; N, 18.49. Found: C, 68.50; H, 5.92; N, 18.29.

EXAMPLE 4

3-Phenyl-2-(1,2,5,6-Tetrahydro-2-Oxo-3-Pyridyl)-2H-Indazole

A solution of 20 g. of o-benzoylphenylhydrazone of 2,3-piperidinedione in 200 ml. glacial acetic acid is refluxed for six hours. The reaction mixture is chilled and adjusted to pH 8 with concentrated ammonia to obtain 3-phenyl-2-(1,2,5,6-tetrahydro - 2 - oxo - 3 - pyridyl)-2H-indazole as a precipitate. The precipitated product is filtered off, washed with cold water, and recrystallized from ethyl acetate; M.P. 231°–236° C.

Analysis for $C_{18}H_{15}N_3O$—Calc.: C, 74.72; H, 5.22; N, 14.32. Found: C, 74.43; H, 5.44; N, 14.54.

EXAMPLE 5

3-Methyl-2-(2-Oxo-3-Piperidyl)-2H-Indazole

*Method A.*—A solution of 9 g. of 2,3-piperidinedione-3-[o-(α-hydroxyethyl)phenyl]hydrazone in 45 ml. 88% formic acid is refluxed for three hours. Concentration of the reaction mixture to one-fourth of its original volume and treatment with 50 ml. water result in the precipitation of a gum. Trituration of this gum with water gives 3-methyl-2-(2-oxo-3-piperidyl)-2H-indazole as a crystalline product which is filtered off, washed with water, and recrystallized from ethyl acetate.

*Method B.*—A solution of 2 millimols of 3-methyl-2-(1,2,5,6-tetrahydro-2-oxo-3-pyridyl)-2H-indazole in 60 ml. ethanol is treated with 50 mg. 10% palladium on charcoal and hydrogenated at 20°–25° C. with hydrogen under atmospheric pressure. After 2.1 millimols of hydrogen are taken up, the reaction mixture is filtered and the filtrate evaporated to dryness to obtain 3-methyl-2-(2-oxo-3-piperidyl)-2H-indazole as a residue. The residue after being recrystallized from ethyl acetate melts at 256°–258° C.

Analysis for $C_{13}H_{15}N_3O$—Calc.: C, 68.10; H, 6.59; N, 18.33. Found: C, 68.12; H, 6.72; N, 18.20.

EXAMPLE 6

3-Phenyl-2-(2-Oxo-3-Piperidyl)-2H-Indazole

*Method A.*—A solution of 9 g. of 2,3-piperidinedione-3-[o-(α-hydrobenzyl)phenyl]hydrazone in 45 ml. 88% formic acid is refluxed for three hours. Concentration of the reaction mixture to one-fourth of its original volume and treatment with 50 ml. water result in the precipitation of a gum. Trituration of this gum with water gives 3-phenyl-2-(2-oxo-3-piperidyl)-2H-indazole as a crystalline product which is filtered off, washed with water, and recrystallized from ethyl acetate.

*Method B.*—A solution of 2 millimols of 3-phenyl-2-(1,2,5,6-tetrahydro-2-oxo-3-pyridyl)2H-indazole in 60 ml. of ethanol is treated with 50 mg. 10% palladium on charcoal and hydrogenated at 20°–25° C. and atmospheric pressure. After 2.1 millimols of hydrogen are taken up, the reaction mixture is filtered and the filtrate evaporated to dryness to obtain 3-phenyl-2-(2-oxo-3-piperidyl)-2H-indazole as a residue. The residue after being recrystallized from ethyl acetate melts at 194°–196° C.

Analysis for $C_{18}H_{17}N_3O$—Calc.: C, 74.20; H, 5.88; N, 14.42. Found: C, 74.16; H, 5.93; N, 13.97.

EXAMPLE 7

3-(o-Ethylphenylhydrazo)-2-Piperidone

A solution of 1 g. 3-methyl-2-(1,2,5,6-tetrahydro-2-oxo-3-pyridyl)-2H-indazole in 50 ml. ethanol is hydrogenated at 20°–25° C. with hydrogen at atmospheric pressure in the presence of 100 mg. 10% palladium on charcoal for five days. Evaporation of the filtered reaction mixture produced 3-(o-ethylphenylhydrazo)-2-piperidone as a white crystalline solid which after being recrystallized from ethanol melts at 208°–212° C.

Analysis for $C_{13}H_{19}N_3O$—Calc.: C, 66.92; H, 8.21; N, 18.01. Found: C, 67.14; H, 8.30; N, 18.16.

EXAMPLE 8

3-(o-Ethylphenylhydrazo)Piperidine Hydrochloride

A solution of 1 g. 3-(o-ethylphenylhydrazo)-2-piperidone in 50 ml. tetrahydrofuran is treated with 1 g. lithium aluminum hydride and refluxed for eight hours. Excess reagent is decomposed by dropwise addition of water, the reaction mixture is filtered, and the residue extracted several times with hot tetrahydrofuran. The filtrate and the extracts are combined, dried over sodium sulfate, and evaporated to dryness in vacuo to give an oily residue. This oily residue is dissolved in ether and the solution is treated with ethereal hydrogen chloride to obtain 3-(o-ethylphenylhydrazo)piperidine hydrochloride as a precipitate. The precipitated hydrochloride is purified by threefold recrystallization from isopropanolacetone; M.P. 240°–245° C.

Analysis for $C_{13}H_{21}N_3 \cdot 2HCl$—Calc.: C, 53.42; H, 7.93; N, 14.38. Found: C, 53.44; H, 8.21; N, 14.13.

EXAMPLE 9

5-Amino-2-(3-Methyl-2H-Indazole-2-yl)-2-Pentenoic Acid

*Method A.*—A suspension of 1 g. 3-methyl-2-(1,2,5,6-tetrahydro-2-oxo-3-pyridyl)-2H-indazole in a solution prepared from 2.5 g. potassium hydroxide, 8 ml. water, and 12 ml. ethanol is refluxed for six hours. The reaction mixture is concentrated in vacuo until most of the ethanol is removed. Treatment with 12 ml. water followed by adjustment to pH 6 by addition of acetic acid to the chilled solution gives 5-amino-2-(3-methyl-2H-indazole-2-yl)-2-pentenoic acid as precipitate. This precipitate is filtered off, washed with cold water, recrystallized from 50% ethanol, and dried over sulfuric acid in a vacuum desiccator.

*Method B.*—A solution of 1 g. 3-methyl-2-(1,2,5,6-tetrahydro-2-oxo-3-pyridyl)-2H-indazole in 25 ml. of 20% hydrochloric acid is refluxed for two hours and the reaction mixture is evaporated to dryness in vacuo to obtain 5-amino-2-(3-methyl-2H-indazole-2-yl) - 2 - pentenoic acid as a hydrochloride salt. The salt is either recrystallized from water or converted to the free base by dissolving in water and adjusting the solution with ammonia to pH 6. The free base after washing with cold water and recrystallizing from 50% ethanol melts at 221°–224° C.

Analysis for $C_{13}H_{15}N_3O_2$—Calc.: C, 63.66; H, 6.16; N, 17.13. Found: C, 63.69; H, 6.30; N, 16.91.

EXAMPLE 10

5-Amino-2-(3-Phenyl-2H-Indazole-2-yl)-2-Pentenoic Acid

This compound is prepared from 3-phenyl-2-(1,2,5,6-tetrahydro-2-oxo-3-pyridyl) - 2H - indazole by the same methods as described for 5-amino-2-(3-methyl-2H-indazole-2-yl)-2-pentenoic acid as in Example 9; M.P. 270°–272° C.

Analysis for $C_{18}H_{17}N_3O_2$—Calc.: C, 70.34; H, 5.58; N, 13.67. Found: C, 70.04; H, 5.75; N, 13.81.

EXAMPLE 11

5-Amino-2-(3-Phenyl-2H-Indazole-2-yl)-2-Pentanoic Acid

This compound is prepared from 3-phenyl-2-(2-oxo-3-piperidyl)-2H-indazole by the same methods as described for 5-amino-2-(3-methyl-2H-indazole-2-yl) - 2 - pentenoic acid in Example 9; M.P. 166°–160° C.

Analysis for $C_{18}H_{19}N_3O_2 \cdot H_2O$—Calc.: C, 66.03; H, 6.47; N, 12.84. Found: C, 66.23; H, 6.70; N, 12.62.

It is understood that the foregoing detailed description is given merely by way of illustration and that many variations may be made therein without departing from the spirit of our invention.

Having described our invention, what we desire to secure by Letters Patent is:

1. A member of the group consisting of compounds of the formula:

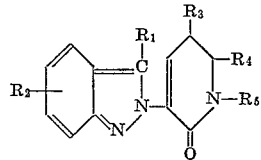

and

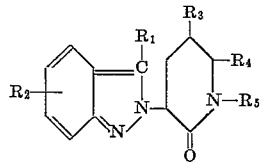

wherein $R_1$ is a member of the group consisting of hydrogen, lower alkyl, phenyl and substituted phenyl

in which $R_6$ is a member of the group consisting of hydrogen, lower alkoxy, halogen, trifluoromethyl, naphthyl, pyridyl and pyrimidyl; $R_2$ is a member of the group consisting of lower alkoxy and halogen and $R_3$, $R_4$ and $R_5$ are each a member of the group consisting of hydrogen and lower alkyl.

2. 3-methyl-2-(1,2,5,6-tetrahydro-2-oxo - 3 - pyridyl)-2H-indazole.
3. 3-phenyl-2-(1,2,5,6-tetrahydro-2 - oxo - 3 - pyridyl)-2H-indazole.
4. 3-methyl-2-(2-oxo-3-piperidyl)-2H-indazole.
5. 3-phenyl-2-(2-oxo-3-piperidyl)-2H-indazole.

References Cited in the file of this patent

UNITED STATES PATENTS

| | | |
|---|---|---|
| 2,903,461 | Smith | Sept. 8, 1959 |
| 2,903,462 | Nickels et al. | Sept. 8, 1959 |
| 2,929,819 | Erlenmeyer | Mar. 22, 1960 |
| 2,932,646 | Biel | Apr. 12, 1960 |
| 3,014,911 | Engelhardt | Dec. 26, 1961 |
| 3,024,242 | Bodanszky et al. | Mar. 6, 1962 |